(12) United States Patent
Stevens et al.

(10) Patent No.: US 8,694,351 B2
(45) Date of Patent: Apr. 8, 2014

(54) SYSTEM AND METHOD FOR AN AUDIT TOOL FOR COMMUNICATIONS SERVICE PROVIDERS

(75) Inventors: Sue L. Stevens, Sedalia, MO (US); William Radel, Gardner, KS (US); Sandhya Kolety, Overland Park, KS (US); Allen L. Aten, Jr., Tallahassee, FL (US); Dana P. Morris, Leawood, KS (US); David M. Byrne, Shawnee, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 632 days.

(21) Appl. No.: 12/203,606

(22) Filed: Sep. 3, 2008

(65) Prior Publication Data
US 2010/0057510 A1 Mar. 4, 2010

(51) Int. Cl.
*G06Q 10/00* (2012.01)
*G06Q 10/06* (2012.01)

(52) U.S. Cl.
CPC .............. *G06Q 10/063114* (2013.01)
USPC ............. 705/7.15; 705/320; 705/342

(58) Field of Classification Search
CPC .............................................. G06Q 10/063114
USPC .............. 705/7, 320, 342, 1, 8, 7.15
See application file for complete search history.

(56) References Cited

U.S. PATENT DOCUMENTS

| | | | |
|---|---|---|---|
| 4,456,788 A | 6/1984 | Kline et al. |
| 4,669,113 A | 5/1987 | Ash et al. |
| 4,756,019 A | 7/1988 | Szbicki |
| 5,054,096 A | 10/1991 | Beizer |
| 5,526,408 A | 6/1996 | Yekutiely |
| 5,687,224 A | 11/1997 | Alley, Jr. et al. |
| 5,844,823 A | 12/1998 | Mishra |
| 5,884,284 A | 3/1999 | Peters et al. |
| 5,920,846 A | 7/1999 | Storch et al. |
| 5,999,932 A | 12/1999 | Paul |
| 6,028,924 A | 2/2000 | Ram et al. |
| 6,104,798 A | 8/2000 | Lickiss et al. |
| 6,122,632 A | 9/2000 | Botts et al. |
| 6,137,873 A | 10/2000 | Gilles |
| 6,219,648 B1 | 4/2001 | Jones et al. |

(Continued)

FOREIGN PATENT DOCUMENTS

EP    1 235 415 A2    2/1998

OTHER PUBLICATIONS

Non-Final Rejection date mailed Mar. 18, 2008 in U.S. Appl. No. 10/610,117.

(Continued)

*Primary Examiner* — Ryan Zeender
*Assistant Examiner* — Hunter Wilder
(74) *Attorney, Agent, or Firm* — Swanson & Bratschun, L.L.C.

(57) ABSTRACT

A method for auditing installation of communications facilities. Network engineering information is received. The network engineering information may include telecommunications installation requirements and a budget associated with one or more telecommunications projects. A portal is displayed to receive telecommunications installation information from one or more contractors assigned to perform the one or more telecommunications projects. Auditing information associated with the one or more telecommunications projects is received. The auditing information and the network engineering information are automatically compared to the telecommunications information to determine deviations for multiple criteria. The deviations are reported for adjusting the compensation of the contractor.

20 Claims, 8 Drawing Sheets

(56) References Cited

U.S. PATENT DOCUMENTS

| | | | |
|---|---|---|---|
| 6,226,286 | B1 | 5/2001 | Danne et al. |
| 6,285,748 | B1 | 9/2001 | Lewis |
| 6,349,238 | B1 | 2/2002 | Gabbita et al. |
| 6,385,609 | B1 | 5/2002 | Barshefsky et al. |
| 6,389,126 | B1 | 5/2002 | Bjornberg et al. |
| 6,647,105 | B1 | 11/2003 | Gilles |
| 6,707,903 | B2 | 3/2004 | Burok et al. |
| 6,724,876 | B2 | 4/2004 | Williams et al. |
| 6,778,638 | B1 | 8/2004 | Jean et al. |
| 6,865,268 | B1 | 3/2005 | Matthews et al. |
| 6,937,701 | B1 | 8/2005 | Gold |
| 6,937,993 | B1 | 8/2005 | Gabbita et al. |
| 7,142,655 | B2 | 11/2006 | Malinowski et al. |
| 7,221,912 | B2 | 5/2007 | Nelson et al. |
| 7,289,605 | B1 | 10/2007 | Jean et al. |
| 7,308,094 | B1 | 12/2007 | Jean et al. |
| 7,660,402 | B1 | 2/2010 | Dwekat et al. |
| 7,769,153 | B1 | 8/2010 | McDougal et al. |
| 2002/0111842 | A1 | 8/2002 | Miles |
| 2003/0046184 | A1 | 3/2003 | Bjorklund et al. |
| 2003/0130820 | A1 | 7/2003 | Lane, III |
| 2004/0024862 | A1 | 2/2004 | Wall et al. |
| 2004/0073466 | A1* | 4/2004 | Norquist et al. ............ 705/7 |
| 2004/0267586 | A1 | 12/2004 | McDougal et al. |
| 2007/0265901 | A1* | 11/2007 | Olson et al. ................ 705/8 |
| 2007/0276722 | A1* | 11/2007 | Silvera et al. .............. 705/11 |
| 2008/0212748 | A1 | 9/2008 | Stillman et al. |
| 2008/0275714 | A1* | 11/2008 | Martinez .................... 705/1 |
| 2008/0301571 | A1* | 12/2008 | Herzog ...................... 715/764 |
| 2009/0049063 | A1* | 2/2009 | Lacopo ...................... 707/100 |
| 2009/0051871 | A1 | 2/2009 | Warden et al. |
| 2009/0113427 | A1* | 4/2009 | Brady et al. .............. 718/100 |
| 2009/0138284 | A1* | 5/2009 | Guadagna et al. ........ 705/3 |
| 2009/0193001 | A1* | 7/2009 | Boris et al. ............... 707/3 |
| 2010/0211515 | A1* | 8/2010 | Woodings et al. ........ 705/320 |

OTHER PUBLICATIONS

Notice of Abandonment date mailed Sep. 26, 2008 in U.S. Appl. No. 10/610,117.
Petition for Withdrawal of the Holding of Abandonment and Amendment date mailed Mar. 12, 2009 in U.S. Appl. No. 10/610,117.
Decision on Petition for Withdrawal of the Holding of Abandonment date mailed Mar. 30, 2009 in U.S. Appl. No. 10/610,117.
Petition to Revive Unintentionally Abandoned Patent Application and Amendment filed Apr. 10, 2009 in U.S. Appl. No. 10/610,117.
Decision on Petition to Revive Unintentionally Abandoned Patent date mailed May 6, 2009 in U.S. Appl. No. 10/610,117.
Final Rejection date mailed Jul. 31, 2009 in U.S. Appl. No. 10/610,117.
RCE/Amendment filed Sep. 23, 2009 in U.S. Appl. No. 10/610,117.
Non-Final Rejection date mailed Dec. 24, 2009 in U.S. Appl. No. 10/610,117.
Response filed Jan. 12, 2010 to Non-Final Rejection dated Dec. 24, 2009 in U.S. Appl. No. 10/610,117.
Non-Final Rejection date mailed Apr. 9, 2009 in U.S. Appl. No. 10/610,191.
Response filed May 26, 2009 to Non-Final Rejection date mailed Apr. 9, 2009 in U.S. Appl. No. 10/610,191.
Final Office Action date mailed Oct. 6, 2009 in U.S. Appl. No. 10/610,191.
Pre-Brief Conference Request and Remarks to Same; Notice of Appeal filed Nov. 12, 2009 in U.S. Appl. No. 10/610,191.
Pre-Brief Appeal Conference Decision date mailed Jan. 6, 2010 in U.S. Appl. No. 10/610,191.
Non-Final Rejection date mailed Mar. 6, 2009 in U.S. Appl. No. 10/610,208.
Response filed Jun. 1, 2009 to Non-Final Action date mailed Mar. 6, 2009 in U.S. Appl. No. 10/610,208.
Final Rejection date mailed Sep. 10, 2009 in U.S. Appl. No. 10/610,208.
Response filed Sep. 30, 2009 to Final Rejection dated Sep. 10, 2009 in U.S. Appl. No. 10/610,208.
Advisory Action date mailed Oct. 9, 2009 in U.S. Appl. No. 10/610,208.
RCE/Amendment filed Oct. 27, 2009 in U.S. Appl. No. 10/610,208.
Non-Final Rejection date mailed Dec. 18, 2009 in U.S. Appl. No. 10/610,208.
Response filed Jan. 12, 2010 to Non-Final Rejection date mailed Dec. 18, 2009 in U.S. Appl. No. 10/610,208.
RCE/amendment filed Mar. 24, 2009 in U.S. Appl. No. 10/610,118.
Non-Final Rejection date mailed Apr. 14, 2009 in U.S. Appl. No. 10/610,118.
Response filed Jul. 14, 2009 to Non-Final Rejection date mailed Apr. 14, 2009 in U.S. Appl. No. 10/610,118.
Final Rejection date mailed Nov. 24, 2009 in U.S. Appl. No. 10/610,118.
Pre-Brief Appeal Conference Decision date mailed Apr. 9, 2009 in U.S. Appl. No. 10/715,781.
Non-Final Rejection date mailed Jun. 25, 2009 in U.S. Appl. No. 10/715,781.
Response filed Aug. 11, 2009 to Non-Final Rejection date mailed Jun. 25, 2009 in U.S. Appl. No. 10/715,781.
Notice of Allowance date mailed Oct. 19, 2009 in U.S. Appl. No. 10/715,781.
RCE/Amendment filed Feb. 5, 2010 in U.S. Appl. No. 10/610,191.
Non-Final Rejection date mailed Feb. 18, 2010 in U.S. Appl. No. 10/610,191.
Final Office Action date mailed Nov. 28, 2008 for U.S. Appl. No. 10/610,191.
RCE/Response filed Jan. 23, 2009 to Final Office Action date mailed Nov. 26, 2008 for U.S. Appl. No. 10/610,191.
Final Office Action date mailed Nov. 28, 2008 for U.S. Appl. No. 10/610,208.
Response filed Dec. 29, 2008 to Final Office Action date mailed Nov. 28, 2008 for U.S. Appl. No. 10/610,208.
Advisory Action date mailed Jan. 28, 2009 for U.S. Appl. No. 10/610,208.
Final Office Action date mailed Dec. 24, 2008 for U.S. Appl. No. 10/610,118.
Pre-Appeal Brief filed Jan. 8, 2009 to Final Office Action date mailed Oct. 17, 2008 for U.S. Appl. No. 10/715,781.
Notice of Allowance date mailed Apr. 2, 2010 in U.S. Appl. No. 10/610,117.
Final Rejection date mailed Mar. 29, 2010 in U.S. Appl. No. 10/610,208.
Response filed May 18, 2010 for U.S. Appl. No. 10/610,191.
Non-Final Office Action date mailed Sep. 1, 2010 for U.S. Appl. No. 10/610,191.
RCE/Amendment filed Jun. 24, 2010 for U.S. Appl. No. 10/610,208.
Non-Final Office Action date mailed Sep. 22, 2010 for U.S. Appl. No. 10/610,208.
Notice of Abandonment date mailed Jun. 1, 2010 for U.S. Appl. No. 10/610,118.
Restriction Requirement date mailed Oct. 5, 2010 for U.S. Appl. No. 11/787,571.
Response filed Nov. 4, 2010 for U.S. Appl. No. 11/787,571.
"Pulsar's WavPort Voice-Activated Services", http://www.lynuxworks.com/solutions/telecom/inaction/pulsar.php3, 3 pages.
Non-Final Office Action dated Jan. 8, 2008 for U.S. Appl. No. 10/610,191.
Response filed Apr. 8, 2008 to Non-Final Office Action dated Jan. 8, 2008 for U.S. Appl. No. 10/610,191.
Notice of Non-Compliant Amendment dated Aug. 11, 2008 or U.S. Appl. No. 10/610,191.
Response filed Sep. 3, 2008 to Notice of Non-Compliant Amendment dated Aug. 11, 2008 or U.S. Appl. No. 10/610,191.
Non-Final Office Action dated Jul. 9, 2007 for U.S. Appl. No. 10/610,208.
Response filed Nov. 9, 2007 to Non-Final Office Action dated Jul. 9, 2007 for U.S. Appl. No. 10/610,208.
Final Office Action dated Feb. 7, 2008 for U.S. Appl. No. 10/610,208.
Response filed May 7, 2008 to Final Office Action dated Feb. 7, 2008 for U.S. Appl. No. 10/610,208.

(56) References Cited

OTHER PUBLICATIONS

Non-Final Office Action dated Jun. 12, 2008 for U.S. Appl. No. 10/610,208.
Response filed Jul. 18, 2008 to Non-Final Office Action dated Jun. 12, 2008 for U.S. Appl. No. 10/610,208.
Non-Final Office Action dated Dec. 20, 2007 for U.S. Appl. No. 10/610,118.
Response filed Mar. 18, 2008 to Non-Final Office Action dated Dec. 20, 2007 for U.S. Appl. No. 10/610,118.
Non-Final Office Action dated Jul. 28, 2008 for U.S. Appl. No. 10/610,118.
Response filed Oct. 16, 2008 to Non-Final Office Action dated Jul. 28, 2008 for U.S. Appl. No. 10/610,118.
Non-Final Office Action dated Apr. 3, 2008 for U.S. Appl. No. 10/715,781.
Response filed Jul. 1, 2008 to Non-Final Office Action dated Apr. 3, 2008 for U.S. Appl. No. 10/715,781.
Final Office Action dated Oct. 17, 2008 for U.S. Appl. No. 10/715,781.

* cited by examiner

| Region Work Activity Report 600 |
|---|

602 Auditor: Stevens, Susan L.
604 Division: LTD
606 From/To: 06/01/2008 - 06/19/2008

608 Region: MID-ATLANTIC OPERATIONS

610 Inspections
Total Audits Initiated         954
Total Audits Completed         813
Total Audits Re-Isp Reqd       100
Total Audits Re-Inspected       58

612 Completed Audits  ☐

| Category 614 | Units 616 | Defects 618 | Index 620 |
|---|---|---|---|
| Physical Defect Totals | 17026 | 1104 | 93.52% |
| Quality of Work | 17026 | 765 | 95.51 |
| Protection of Facilities | 17026 | 2 | 99.99 |
| Customer Service | 17026 | 5 | 99.97 |
| Schedule Adherence | 17026 | 0 | 100.0 |
| Regulations & Safety | 17026 | 322 | 98.11 |
| Records Accuracy | 17026 | 10 | 99.94 |
| Billing Accuracy | 17026 | 310 | 98.18% |
| Item Difference Amount | | | ($16, 171.62) |

Top Physical Defects By Group

Quality of Work 622
224 - Gravel missing, low, too high, wrong type          Service Affecting - 1784
                                                          Non Service Affecting - 655
249 - EMS marker not placed

Protection of Facilities 624
259 - Cable warning signs not placed/improper             Service Affecting - 55
908 - Other - Protection of Facilities (be specific in note field)   Non Service Affecting - 20

Customer Service 626
264 - Customer/Executive/PUC Complaint received           Service Affecting - 3
                                                          Non Service Affecting – No Defects

Schedule Adherence 628
910 - Other - Schedule Adherence (be specific in note field)   Service Affecting – No Defects
                                                          Non Service Affecting – 2

Regulations & Safety 630
272 - Improper grounding                                  Service Affecting - 1824
273 - Abandoned ground improperly removed                 Non Service Affecting - 6

Records Accuracy 632
277 - Asbuilts not complete/ not accurate                 Service Affecting - 178
278 - Materials Use forms not populated/not accurate      Non Service Affecting – 1

Billing Accuracy 634
287 - Incorrect quantity charged to item code             Non Service Affecting - 8

FIG. 7

Work Activity Detailed Summary Report 700

Work Activity #: 05219077    Auditor Name: Best, Stephen F.    Date of Audit: 05/23/2008
District: Midwest
Total Invoiced Amount: $23,941.91    Total Audited Amount: $20,961.61    Total Item Diff Amount: ($2,980.30)    Total Est Labor Amt: $2,440.00    WA Title: JNCY-SOR T-1 Sprint Tower Engineer Name: Osbourn, Vanessa C    Dollars Recovered <u>XXX</u>: $

Loc Desg: 4    704    Invoice #: GEY1194    Vendor #: 0271714001
Contract #: 5110    Contract Firm: Diligent    Employee: Fetcher
Dt Work Comp: 02/11/08    Dt Inv Apvd: 02/26/08    Remarks: JNCYSOR T1 Brdcst Tower HWY 77

706

| Sh # <u>XXX</u> | Inv Ln # | Billed Unit Item Code & Desc | Qty | Contr Ext Inv Amt | Correct Unit Item Code | Correct Qty & Units | Correct Audit Ext Capt Amt | Item Diff | Fin Dev Code | Phy Dev Code | Fin & Phy Dev Desc | CIP D/O | Lbr Cd | Correct Lbr Cd | Reclass Amount | Notes |
|---|---|---|---|---|---|---|---|---|---|---|---|---|---|---|---|---|
| | | 61332 | | | | | | | | | 708 | | | | | |
| 4 | 12 | Remove All Copper Cable/Innerd | 4252 | 4039.40 | 613332 | 4039 -- 1 | 3837.05 | -202.35 | 287 | 906 | Incorrect quantity charged to Item Code. ------ Other - Cable Removals | | 2X | | 0.00 | Removal IPIDS 300635= 196/300638 =1190' Total Removed by IPIDS 4039 Feet |
| Sub Total | | | | $4,039.40 | | | $3,837.05 | ($202.35) | | | | | | | $0.00 | |

710

Initiated: ☐    Package Complete: 05/27/2008    Status    Physical Deviations Re-Inspection Reqd: ☐
Date Reviewed with District Team:    Date Physical Deviations Re-Inspected:
Date Reviewed with Master Supplier:    Date Over-Billed Costs Recovered:

FIG. 8

Work Activity Summary Report  800

| | | | |
|---|---|---|---|
| Work Activity # 802 | 05290177 | District 804 | Midwest |
| Auditor Name 806 | Best, Stephen F. | Date of Audit 808 | 05/29/08 |
| Engineer Name 810 | Osbourn, Vanessa C. | Audit Title 812 | JNCY-SOR C-1 Brdcst Tower |
| Dollars Received 814 | $45,000 | | |

STATUS 816

| | | | |
|---|---|---|---|
| Initiated : | ☐ | Date Reviewed with District Team: | 05/13/08 |
| Package Complete : | 05/27/08 | Date Over-Billed Costs Recovered: | 05/26/08 |
| Physical Deviations Re-Inspected Reqd: | | ☐ | |
| Date Reviewed with Master Supplier: | 05/15/08 | | |
| Physical Deviations Re-Inspected: | 05/26/08 | | |

Amounts and Deviations  818

| | | | |
|---|---|---|---|
| Total Invoiced Amount: | $23,941.91 | Total Units Audited: | 18 |
| Total Audited Amount: | $20,961.61 | Total Physical Deviations:<br>Physical Deviation Pct: | 9<br>50.00% |
| Total Item Diff. Amount: | $2,980.30 | Total Final Deviations:<br>Final Deviations Pct: | 5<br>27.78% |
| Total Est. Labor Amount: | $2,440.00 | | |

Close

SYSTEM AND METHOD FOR AN AUDIT TOOL FOR COMMUNICATIONS SERVICE PROVIDERS

BACKGROUND OF THE INVENTION

The use of and development of communications has grown nearly exponentially in recent years. The growth is fueled by larger networks with more reliable protocols and better communications hardware available to service providers and consumers. In order to satisfy the growing need for communications services, service providers are constantly installing or modifying equipment. Most service providers rely on contractors because of the amount, scale, and complexity of installation projects that are ongoing at any time.

Tracking installation projects is typically done using antiquated systems or using a number of documents or spreadsheets that do not allow for easy review or analysis. Telecommunications installation audits are difficult to coordinate and manage because of the numerous participating parties. As a result, service providers are frequently over billed or charged for inadequate or incorrectly installed facilities. In many cases, it is difficult to recognize and reward contractors that have consistently good installation performance and to correct contractors with poor performance.

BRIEF SUMMARY OF THE INVENTION

One embodiment provides a system and method for auditing installation of communications facilities. Network engineering information may be received. The network engineering information may include telecommunications installation requirements and a budget associated with one or more telecommunications projects. A portal may be displayed to receive telecommunications installation information from one or more contractors assigned to perform the one or more telecommunications projects. Auditing information associated with the one or more telecommunications projects may be received. The auditing information and the network engineering information may be automatically compared to the telecommunications information to determine deviations for multiple criteria. The deviations may be reported for adjusting the compensation of the contractor.

Another embodiment may provide a server configured to audit telecommunications information. The server may include a user interface configured to receive network engineering information, audit information, and telecommunications installation information from a user by presenting menus and querying the users. The server may also include one or more databases in communication with the user interface configured to store the network engineering information, audit information, and telecommunications installation information. The server may also include a comparator in communication with the one or more databases configured to compare the network engineering information and audit information with the telecommunications installation information to determine deviations for telecommunications criteria included in the network engineering information, audit information, and telecommunications installation information. The user interface may output a score card based on the deviations ranking the performance of one or more contractors.

Yet another embodiment may provide a server for rating the performance of contractors installing communications facilities. The server may include a processor for executing a set of instructions and memory for storing the set of instructions. The set of instructions may be configured to receive engineering information for multiple criteria including installation requirements and a budget for one or more projects, display a portal configured to receive installation information for the multiple criteria from one or more contractors assigned to perform the one or more projects, receive auditing information for the multiple criteria of the one or more projects, automatically compare the auditing information and the engineering information to the installation information to determine deviations for the multiple criteria, and report the deviations for adjusting the compensation of the contractor.

BRIEF DESCRIPTION OF THE DRAWINGS

Illustrative embodiments of the present invention are described in detail below with reference to the attached drawing figures, which are incorporated by reference herein and wherein:

FIG. 6 is a pictorial representation of a work activity report in accordance with an illustrative embodiment;

DETAILED DESCRIPTION OF THE INVENTION

Illustrative embodiments of the present invention provide a system and method for auditing installation of telecommunications facilities and equipment. An audit program or system may allow user input from management, engineering, accounting, auditors, and contractors to be compiled and reconciled for automatically rewarding or penalizing contractors for installation performance. As a result, a communications service provider may save millions of dollars in accurate billing and installation management.

Figure 1:
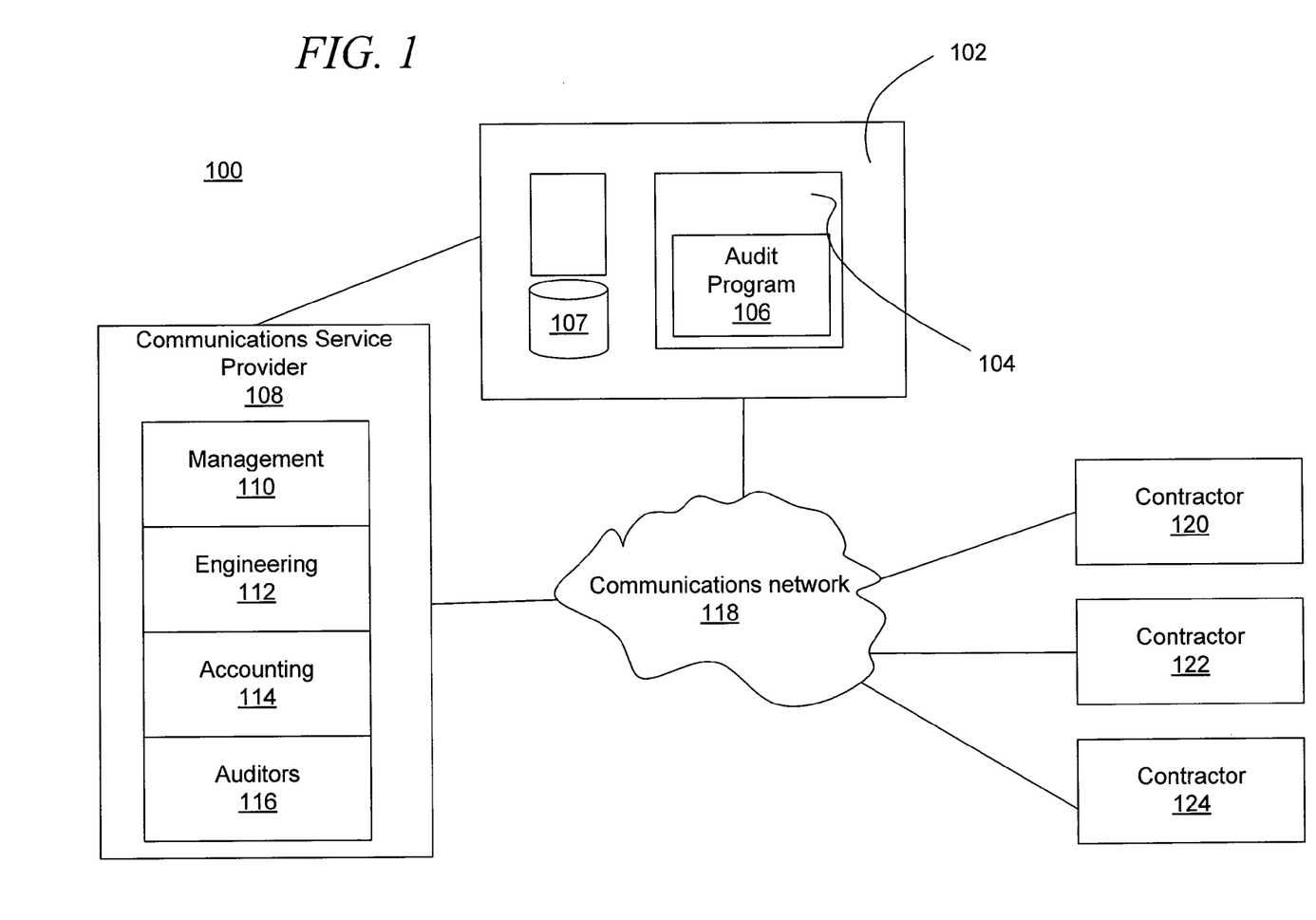
FIG. 1 is a pictorial representation of a communications environment in accordance with an illustrative embodiment.

FIG. 1 is a pictorial representation of a communications environment 100 in accordance with an illustrative embodiment. The communications environment 100 is the environment or setting of one or more communications service providers. The communications environment 100 may include any number of components, devices, or other elements. In one embodiment, the communications environment 100 may include a communications management system 102, a server 104, an audit program 106, a database 107, a communications service provider 108, management 110, engineering 112, accounting 114, auditors 116, a communications network 118, and contractors 120, 122, and 124.

Communications within the communications environment 100 may occur on any number of networks including the communications network 118. The communications network 118 is an infrastructure for sending and receiving messages and signals according to one or more designated formats, standards, and protocols. The communications network 118 may include wireless networks, data or packet networks, cable networks, satellite networks, private networks, publicly switched telephone networks (PSTN), or other types of communication networks. The networks of the communications environment 100 may represent a single communication service provider or multiple communications service providers. The features, services, and processes of the illustrative embodiments may be implemented by one or more elements of the communications environment 100, independently or as a networked implementation.

The communications management system 102 is one or more devices utilized to enable, initiate, route, and manage communications between one or more communication devices or computing devices. The communications management system 102 may include one or more devices networked to manage the communications network 102.

In one embodiment, the communications management system 102 includes the server 104 that hosts, distributes, or executes the audit program 106 and the database 107. The audit program 106 is an organization of instructions or modules for tracking projects, tasks, and installations for a communications service provider. In one embodiment, the audit program 106 may be implemented in hardware, firmware, software, or any combination thereof. In one embodiment, the audit program 106 may be digital logic that accesses memory to perform the features herein described. The database 107 is a structured collection of data that is accessible by the server 104 and the audit program 106. The database 107 may include any number of databases, memory elements, data collections, storage records, or data storage devices. The communications management system 102 may also include any number of additional servers, routers, switches, or intelligent network devices. The communications network 118 sends and receives the electronic signals through any number of transmission mediums. The communications network 118 may include various fiber optics, cables, transmission towers, antennas, or other elements for transmitting data or voice communications to the connected communications devices and computing devices.

In one embodiment, the communications management system 102 and the communications network 118 may be configured to send and receive and manage voice communications for Voice over Internet Protocol (VoIP) phones, plain old telephone service (POTS) phones, wireless devices, and/or other forms of data and voice communications.

The communications service provider 108 is the service provider that utilizes the audit program 106 to manage the installation of communications equipment and audit the performance of the contractors 120, 122, and 124. The communications service provider 108 is a company or organization that provides communications services to one or more customers. The communications service provider 108 may represent the computing interface between users and the communications management system 102. The communications service provider 108 may include modules, applications, or divisions represented by management 110, engineering 112, accounting 114, and auditors 116. The elements of the communications service provider 108 may represent the computing interface to the individuals or users within management 110, engineering 112, accounting 114, and auditors 116.

The contractors 120, 122, and 124 are individuals, firms, companies, or partnerships that contract with the communications service provider 108 to perform projects or install communications equipment. The contractors 120, 122, and 124 are shown for illustration purposes and represent any number of contractors that may be utilized by the communications service provider 108. The contractors 120, 122 and 124 may be represented by access points, computing devices, databases, or individuals. In one example, multiple data entry specialists may represent the contractors 120, 122, 124, management 110, engineering 112, accounting 114, and auditors 116 by sending installation information through the communications network 118 to the audit program 106. The applicable information may also be entered directly by a supervisor or manager for each group respectively based on the policies and requirements of the communications service provider 108 as required by the audit program 106. For example, a username and password may be required to access the audit program 106 and enter or retrieve information. An interactive voice response system may also be used to enter user information.

The communications service provider 108 and contractors 120, 122, and 124 may access a centrally hosted or stored version of the audit program 106. For example, a web interface or wireless application protocol may be utilized to access the audit program 106. In another embodiment, a local version or copy of the audit program 106 may be stored locally by the elements of the communications service provider 108 and the contractors 120, 122, and 124.

The contractors 120, 122, and 124 perform installation services for the communications service provider 108 based on negotiated contracts and terms. The contracts and terms specify requirements for all work performed for the communications service provider 108 and specific requirements for each job. The various requirements and terms for each project may be based on best practices, applicable laws, zoning, or local ordinances, customer preferences, and other information. For example, specified requirements may include material types, cable drop burial depth, bonding and grounding, resistance readings, sealant, sizing, placement, splices, mounting requirements, separation distances, and clean up standards. The information and criteria entered for each project, task, or event may include contract number, engineer's estimated cost (from a cost tool), work activity number, location code, invoice number, sheet, Location Designator (LD), date work completed, date work invoiced, date invoice approved, invoice line number, labor code charged, billed unit item code, unit item description, quantity, contractor's extended invoiced amount, correct item code, correct quantity, correct audited extended captured cost, difference/variance between charged and audited amounts, financial deviation code, physical deviation code, physical deviation description, proper or re-classed labor code, re-classed amount, notes, or any other suitable data.

The contractors 120, 122, and 124 may also report specific information regarding each project including approved changes in progress (CIP), labor and material charges, material requests, area maps, required permits, timesheets, and other required documentation.

In most cases, it is difficult to audit every project performed by numerous contractors. As a result, management 110 or auditors 116 may use any number of algorithms, strategies, or random selections to audit projects, work orders, or tasks performed by the contractors 120, 122, and 124. In one embodiment, auditors 116 may be an independent or external group that performs the audits and reports the relevant information through access to the audit program 106. An independent auditor may be particularly beneficial as a neutral party that has not established biases for the communications service provider or contractors. Similarly, engineering 112 and accounting 114 may be external groups or outsourced labor.

Auditors 116 may utilize the audit program 106 to receiving training and instruction for performing audits. An auditor may complete training, certification, knowledge, testing, and proficiency requirements through the audit program 106 in order to be fully qualified to perform the audit. In one embodiment, the auditor may be able to retrieve a form as well as reserve resources, such as cable locators, tool kits, vault locks, vehicles, and other tools or resources that may be required to accurately perform the audit. Auditors 116 may print a blank form for all of the required inspection elements based on information from engineering 112 and the contractors 120, 122, and 124. The blank form may also summarize deadlines, reporting requirements, and other written expectations.

Figure 2:
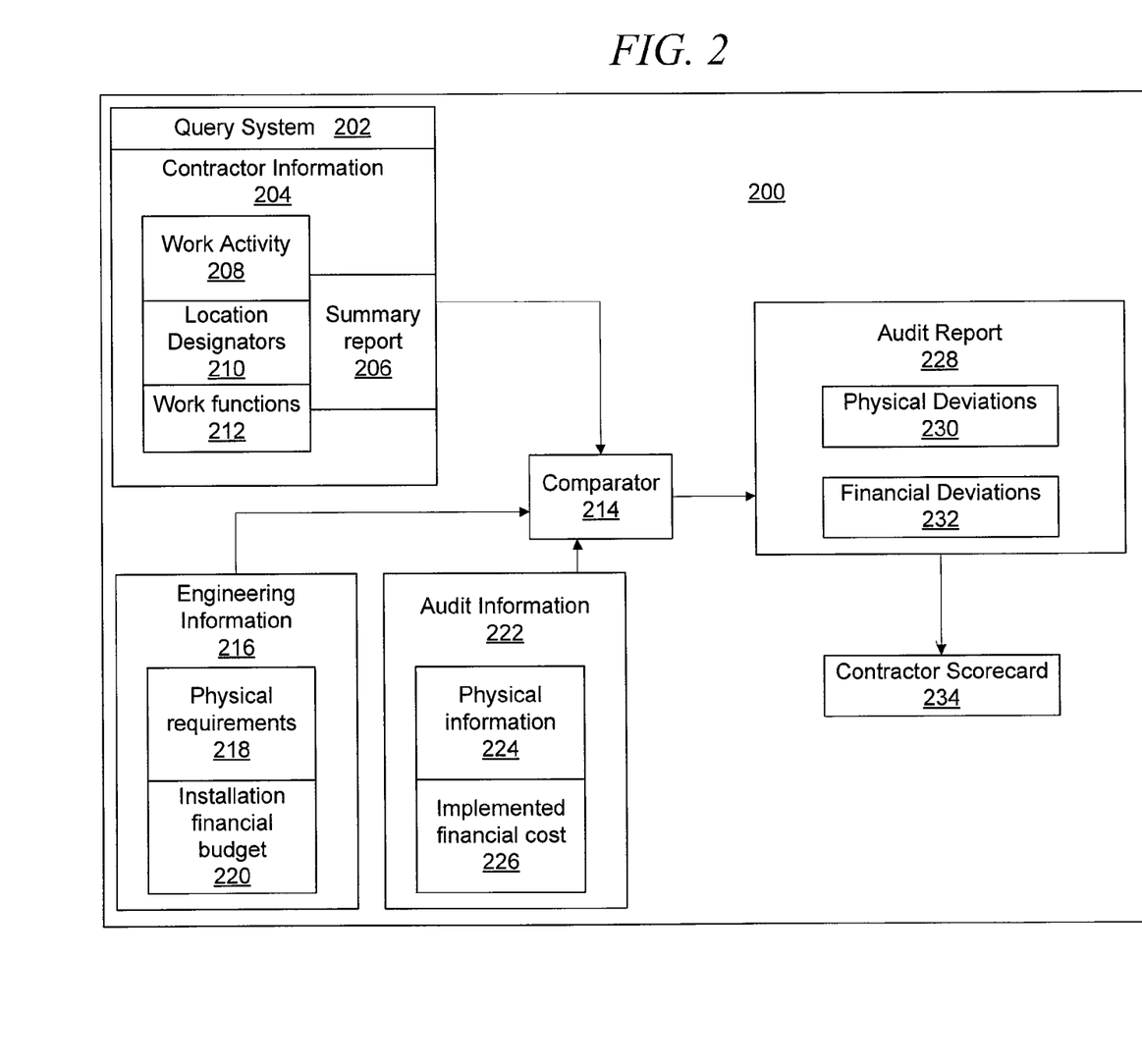
FIG. 2 is a block diagram of an audit program in accordance with an illustrative embodiment.

FIG. 2 is a block diagram of an audit program 200 in accordance with an illustrative embodiment. The audit program 200 is a particular implementation of the audit program 106 of FIG. 1. The audit program 200 may include a query system 202, contractor information 204, a summary report 206, work activity 208, location designators 210, work functions 212, comparator 214, engineering information 216, physical requirements 218, installation financial budget 220, audit information 222, physical information 224, implemented financial cost 226, audit report 228, physical deviations 230, financial deviations 232, and contractor score card 234.

The audit program 200 may include any number of modules or interfaces. In one embodiment, the audit program 200 may utilize a number of different databases, such as the database 107 of FIG. 1 to access and store relevant information. The audit program 200 may utilize drop down menus, buttons, forms, text fields, tables, spreadsheets, icons, and other indicators to display information and receive user input. The information of the audit program 200 may be imported, extracted to other programs, output as documents or spreadsheets, displayed utilizing various screens, and printed for facilitating review of the information.

The query system 202 is a module for retrieving and storing information. The query system 202 may be configured to receive information by presenting forms to a user based on a user profile or based on a user request. The query system 202 may also be utilized to auto populate all invoice data related to a specific work activity, serial number, invoice number, sheet, date work complete, date work invoiced, date invoice approved, invoice line number, labor code charged, billed unit item code and description, quantity, extended invoiced amount, or labor code onto a worksheet or document. The query system 202 may present a menu and any number of screens for interacting with one or more users. The query system 202 may receive information from management, engineers, accountants, auditors, and contractors. As previously described, the audit program 200 and the query system 202 may restrict access to authorized users. For example, management of the communications service provider may be given full read and write access for all projects while a contractor may be given limited read and write access for specific fields and sections of installation projects assigned to the contractor.

The work activity 208, location designators 210, and work functions 212 may be sub-categories of the contractor information 204. The work activity 208 includes a number of location designators 210 and each location designator may include multiple work functions 212. The summary report 206 is a summary of the installation information for the work activity 208 or specified location designators 210 or work functions 212. In one embodiment, the work activity 208, location designators 210, and work functions 212 may store documented deviations from engineering design, cost differentials, installation hours, and any number of physical and financial requirements of the applicable installation. The summary report 206 is a report of the information performed by one or more of the contractors based on specified reporting criteria or terms.

The projects and information may allow the user to review all financial information for installation projects, quality of performance, projects by date, and contractor rating. As a result, management may assign projects based on audit and contractor information.

Engineering information 216 is the information and data received from one or more engineers. The physical requirements 218 are the installation requirements determined by the engineers. The physical requirements 218 may include information, such as depth, type and quantity of installation materials and equipment, configuration of equipment, locations, distances, and other relevant data, information, terms, or criteria. For example, installation policies may specify a standard depth for buried cable and local laws or easements may specify the location of junction boxes. The installation financial budget 220 is the projected costs for the project as determined by the engineer evaluating the project. The installation financial budget 220 may provide a system for the applicable engineer or other user to enter estimated equipment, man hours, and other materials that may be required to finish the project which may be used in conjunction with a price or cost database to estimate the installation financial budget 220 for each project.

Audit information 222 is the information and data received from one or more auditors. In one embodiment, the audit information 222 may be configured to print off a form that may be utilized by the auditor to type or handwrite the criteria of the audit for the work project. Audit information 222 may include an optical character recognition tool or module for retrieving the audit information once measured, observed, or otherwise determined by the auditor. As a result, the audit information 222 may efficiently track the auditing information as received. The audit information 222 may also track and display a status for a number of projects that are being audited. For example, the audit information 222 may display status information, such as "selected for audit", "audit in progress", and "audit completed".

The physical information 224 includes the measurements and documentation recorded by the auditor. In one embodiment, the physical information 224 may be automatically extracted from a handwritten form that is scanned into the audit program 200. The implemented financial cost 226 is the final cost to perform the installation including equipment, labor, and other costs and expenses. The audit information 222 may also include other information, such as auditor's name, location designator, sheet number, invoice number, date work completed, date work invoiced, difference between what was charged and what should have been charged, number of customer complaints, number of damaged facilities, known schedule delays, known safety violations, financial and physical deviations, notes or description of errors for clarity purposes, inappropriate unit time code and/or labor code as appropriate, population of correct quantities, known number of recorded inaccuracies, irregular plant conditions, CIP reasons, proper or re-classified labor codes, re-classed amounts, re-inspection requirements, and audit costs.

The audit information 222 may include logic for selecting projects or contractors to be audited. In one embodiment, the project may be selected randomly for specific geographic regions of the communications service provider. In another embodiment, the project may be selected based on variances between the engineering information and the installation information received from the contractor. Logic or requirements may be utilized to ensure that each contractor is audited a specified number of times for each time period. The requirements may be based on the installation history of the contractor. For example, contractors with a high score card rating may only be audited once every two months or twenty projects while contractors with a lower score card rating may be audited once every two weeks or every ten projects.

The comparator 214 is a device, instrument or logic for comparing different types of information. In one embodiment, the engineering information, installation information from the contractors, and auditor information may be compared to generate the audit report 228. The audit report 228 is the detailed output of information for one or more contractors, installation projects or other specified criteria used by the communications service provider for installation and contractor performance evaluation and analysis. The audit report 228 may particularly detail physical deviations 230 and financial deviations 232. The information included in the audit report 228 may be utilized to generate the contractor score card 234.

In one embodiment, the comparator 214 may be a processor that accesses the modules or databases of the audit program 200 to perform various comparisons. In another embodiment, the comparator 214 may be logic or circuitry that accesses the contractor information 204, engineering information 216, and audit information 222 from a memory, or storage to generate the audit report 228 and contractor score card 234. The comparator 214 may also be pre-configured to receive comparisons manually performed by a user that are utilized to generate score cards, summaries, and other reports. Custom comparisons may also be performed based on queries or other user requests.

The audit report 228 may show physical deviations 230 so that the contractor may redo or fix an installation project. For example, local laws may require cable drops to be buried at or below two feet, as a result, the contractor may be required to rebury a cable drop that only reaches eighteen inches in depth. In another example, the contractor may be required to pay a fine or have compensation reduced for every physical deviation that is encountered as an incentive to perform the installation work as engineered or required.

The audit report 228 may also be utilized to automatically determine an amount or amounts that are required to be refunded to the communications service provider. For example, the contractor may have accidentally double billed the communications service provider for a project and as a result, the audit report 228 may automatically inform a billing supervisor and the contractor of the requested refund amount.

The contractor score card 234 is a rating or performance measurement for a contractor. In one embodiment, contractor score card 234 may be limited to a specific time period, project, region, or based on other criteria. For example, a to/from date may allow the contractor score card 234 to profile the performance of the contractor for a specific timeframe. The contractor score card 234 may also be a general numeric, text, or grade-based performance rating for the contractor that may be printed as a document for review by management of the communications service provider. For example, the performance may be a numeric representation of how well the work was performed as measured by physical and financial deviations. In one example, physical and financial deviations may be assigned a value. For each project, a possible one hundred points may be available. In one embodiment, a perfect score may be the starting point of the evaluation with values for physical and financial deviations extracted from the total possible points to generate the score card. In another embodiment, performance for a number of criteria as objectively and subjectively measured and determined by the auditor, manager, or others may be used to generate the score out of one hundred. Score card values may be averaged by area, project, contractor, time period, or based on other factors to determine the effectiveness of installation projects.

The contractor score card 234 may rate the quality of work, billing accuracy, records accuracy, protection of facilities, customer service, regulations and safety, and schedule adherence. In one embodiment, the contractor score card 234 may be generated quarterly from a score card database. A composite score average may be utilized to visually represent the performance of each contractor shown per time period. The contractor score card 234 may calculate the rating automatically. However, various fields may require manual input, such as a management summary, individual rating (excellent, good, poor), and treatment of the communications service provider employees. The audit report 228 or the contractor score card 234 may recommend additional steps which may include further contractor reviews, cost recovery, re-inspections of physical deviations, and additional auditing. For example, based on poor performance on a project, a contractor may be required to refund a portion of their collected fees and reinstall all or portions of equipment. The contractor may also be subject to increased audits and reviews in the future.

The audit program 200 may automatically determine whether a contractor receives a raise or compensation increase. For example, contractors that have physical deviations 230 and financial deviations 232 under a specified threshold and a rating or score within a specified range may receive a large increase in pay. Those contractors that have sub-par performance may not receive a pay increase, may receive a limited pay increase, or may be dropped as contractors altogether.

Figure 3:
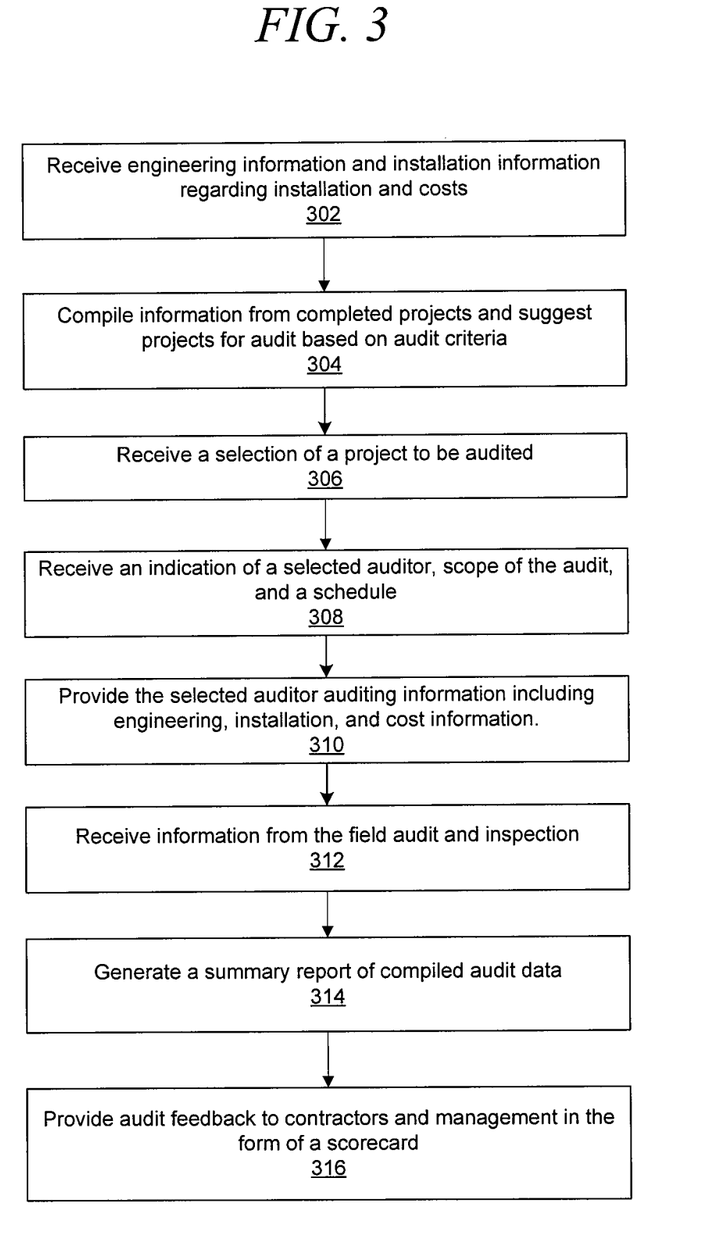
FIG. 3 is a flowchart of a process for auditing installation of telecommunications facilities in accordance with an illustrative embodiment.

FIG. 3 is a flowchart of a process for auditing installation of telecommunications facilities in accordance with an illustrative embodiment. The process of FIGS. 3-5 may be implemented by an audit program. The audit program may be accessed from one or more networked servers and databases. In another embodiment, the audit program may include a host system and locally installed applications for receiving user input. Various permissions and verification processes may ensure that only certain individuals are able to fully access the audit program. In most cases, contractors are granted access to enter information for projects assigned to them and to review the projects each contractor has worked on overall. The process of FIG. 3 may begin by receiving engineering information and installation information regarding installation and costs (step 302). The engineering information may be received by engineers of the communications service provider. The installation information may be received from one or more contractors working on one or more specified projects.

Next, the audit program compiles information from completed projects and suggests projects for audit based on audit criteria (step 304). The information may be automatically compiled for a time period, contractor, project, or based on other criteria. In another embodiment, the audit program may compile the information based on a query or other request of a user. The audit program may flag certain projects or contractors for audit based on prior history or deviations. For example, the program tool may note that nearly twice as much hourly labor was used compared to what had been expected or that the cable length used during installation was not consistent with the engineering information.

The audit program receives a selection of a project to be audited (step 306). The selection of step 306 may authorize an internal or external auditor to prepare for the specified audit.

In one embodiment, the audit program may generate an audit form including spaces to enter audit data by hand or download an intranet form for use with a computing or communications device.

Next, the audit program receives an indication of a selected auditor, scope of the audit, and a schedule (step 308). The audit program may automatically select an auditor to ensure unbiased results or may inform the auditor based on a user selection. The scope of the audit and schedule may specify requirements, guidelines, or policies for performing the audit within a specific time period.

Next, the audit program provides the selected auditor auditing information including engineering, installation, and cost information (step 310). The audit information of step 310 may be provided in the form of a summary or report for the auditor's reference.

Next, the audit program receives audit data from the field audit and inspection (step 312). The audit data and information may be entered by the auditor using a web or user interface to the audit program. In another embodiment, optical character recognition, a bubble sheet, interactive voice response, or other automated systems may retrieve the audit data from the field audit and inspection. The audit data obtained by the auditor may also be imported from or extracted from a measurement, test, or recording device.

Next, the audit program generates a summary report of the compiled audit data (step 314). The summary report may show the physical and financial deviations between the engineering information and the installation information.

The audit program may generate audit feedback for contractors and management in the form of a score card (step 316). The audit program may also take any number of actions based on receiving all of the audit information. For example, the audit program may suggest the communications service provider request a refund, decrease projects assigned to a contractor, increase compensation for a contractor, or otherwise change the business dealings of the communication service provider with the contractor.

Figure 4:
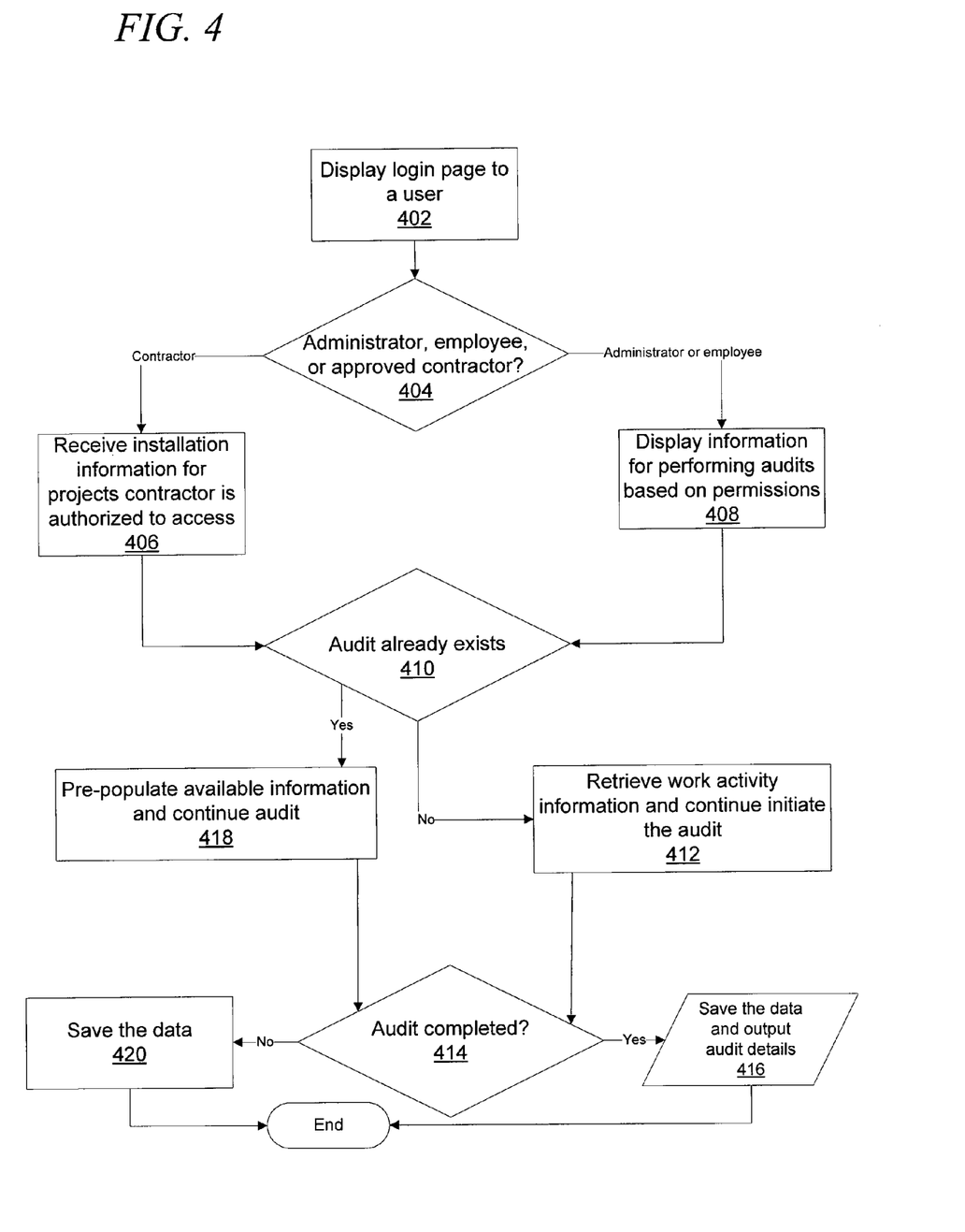
FIG. 4 is a flowchart of a process of utilizing an audit program in accordance with an illustrative embodiment.

FIG. 4 is a flowchart of a process of utilizing an audit program in accordance with an illustrative embodiment. The process may begin by displaying a login page to a user (step 402). The login page may request one or more user identifiers, such as username and password.

Next, the audit program determines whether the user is an administrator, employee or approved contractor (step 404). If the audit program determines the user is a contractor, the audit program receives installation information for projects the contractor is authorized to access (step 406).

If the audit program determines the user is an administrator or employee in step 408, the audit program displays information for performing audits based on permissions (step 408). The permissions may indicate whether the employee or administrator is granted rights or authority to enter audit information. For example, employee access may be limited to pages, fields, and information covered by the employee's responsibilities.

Next, the audit program determines whether the audit already exists (step 410). The audit program may determine if an audit has been specified for the project indicated based on work project, location designators, work function, invoice number, or other data or information. In one embodiment, the contractor may have limited access to audit information. For example, the contractor may only be able to view completed audits through the audit program once performed. If the audit program determines the audit does not already exist, the audit program retrieves work activity information and initiates the audit (step 412).

Next, the audit program determines whether the audit is performed successfully (step 414). The determination of step 414 may be based on whether all information has been completed. For example, if an audit report is completed without errors, the audit may have been performed successfully. If the audit program determines the audit is performed successfully, the audit program saves the data and outputs audit details (step 416). The details may include any number of fields, details, or data generated based on information from the engineers, contractors, auditors, or other users.

If the audit program determines the audit already exists in step 410, the audit program pre-populates available information and continues the audit (step 418). The user may continue by entering additional information, performing queries, or taking additional steps. The audit program then determines if the audit ID performed successfully (step 414). The determination of step 414 may be made based on the correctness and accuracy of the information and steps taken by the user. A user is not required to complete an entire audit in a single session of data entry, rather the process may be ongoing for an undetermined time period. If the audit is not performed successfully, the audit program saves the data (step 420). The data may be saved as finally or partially completed for subsequent review. For example, additional details may be required to complete the audit at a later time based on new or updated information becoming available.

Figure 5:
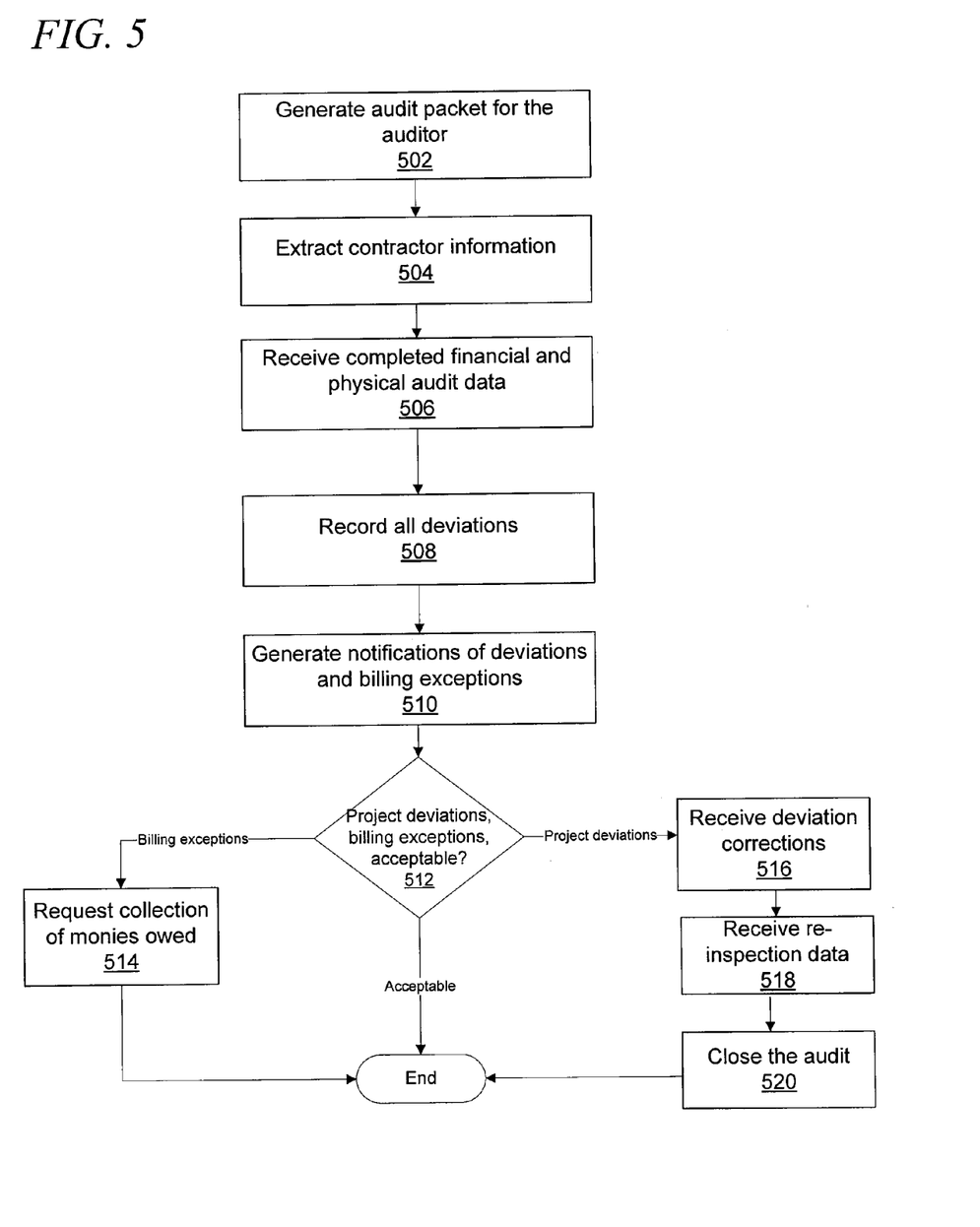
FIG. 5 is a flowchart of a process of information flow within an audit program in accordance with an illustrative embodiment.

FIG. 5 is a flowchart of a process of information flow within an audit program in accordance with an illustrative embodiment. The process of FIG. 5 may begin with the audit program generating an audit packet for the auditor (step 502). The audit packet may include information, such as a map, installation elements, audit requirements, audit policy and guidelines, and other information necessary to perform the audit.

Next, the audit program extracts contractor information (step 504). The contractor information may be extracted from a database, remotely stored audit program, add-on, or from data already stored by the audit program. The contractor information may specify a name, score card rating, and other details. In another embodiment, the audit may be performed without such information to ensure that bias or favoritism is not introduced.

The audit program receives completed financial and physical audit data (step 506). The data may be manually entered by an auditor utilizing an interface of the audit program. In another embodiment, the data of step 506 may be received by importing the data from a computing or communications device utilized by the auditor or by using OCR or other data extraction processes.

Next, the audit program records all deviations (step 508). The deviations may be physical, financial, technical, or other deviations between the engineering information, installation information, and audited information. The audit program may calculate the deviations in step 508.

The audit program generates notifications of deviations and billing exceptions (step 510). The deviations and billing exceptions may be automatically sent to a number of users involved or assigned to the project. For example, the manager overseeing the project, the auditor, data entry specialists, and the foreman of a contracting company may receive alerts indicating the deviations and billing exceptions.

Next, the audit program determines whether there are project deviations, billing exceptions, or everything is acceptable (step 512). If the deviations and billing exceptions are acceptable, the process ends. If the billing exceptions are not acceptable in step 512, the audit program requests collection of monies owed (step 514). For example, the contractor may have billed the communications service provider twice for the installation of a customer drop. In another embodiment, the number of deviations may stipulate that the contractor pay the communications service provider one hundred dollars for each significant deviation as motivation to correct all potential issues before the project is completed or audited.

If the audit program determines there are project deviations in step 512, the audit program receives deviation corrections (step 516). In one embodiment, the contractor may be required to fix deviations and send a correction message based on the notifications of step 510. Payment for the installation project may be withheld or future payments may be placed on hold until the project is corrected.

In some cases, the audit program may receive re-inspection data (step 518) based on a re-inspection request or requirement. The audit program may close the audit (step 520). The audit may be available at any time regardless of whether the audit has been closed or not.

Figure 7:
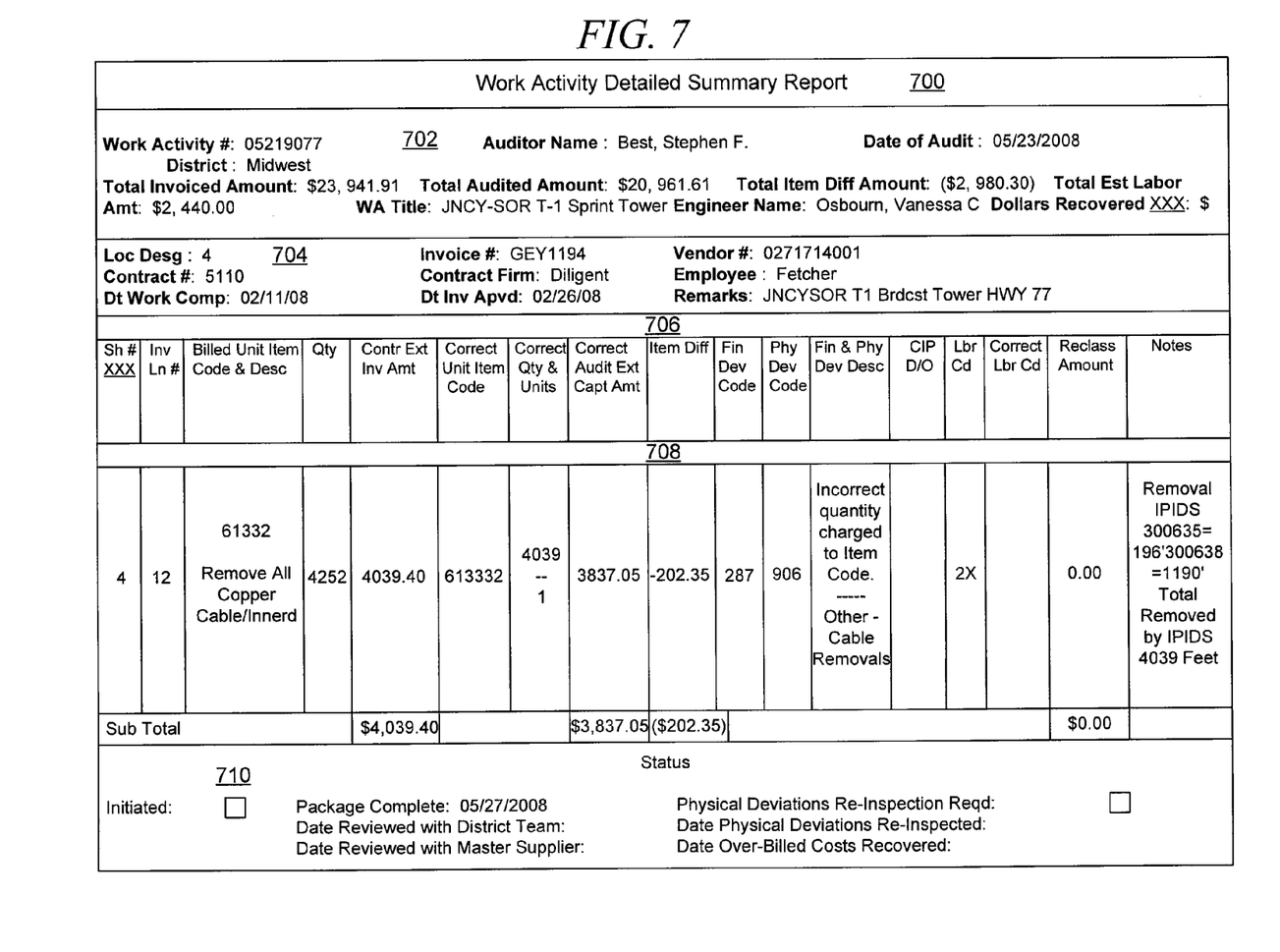
FIG. 7 is a pictorial representation of a detailed work activity report in accordance with an illustrative embodiment.
Figure 8:
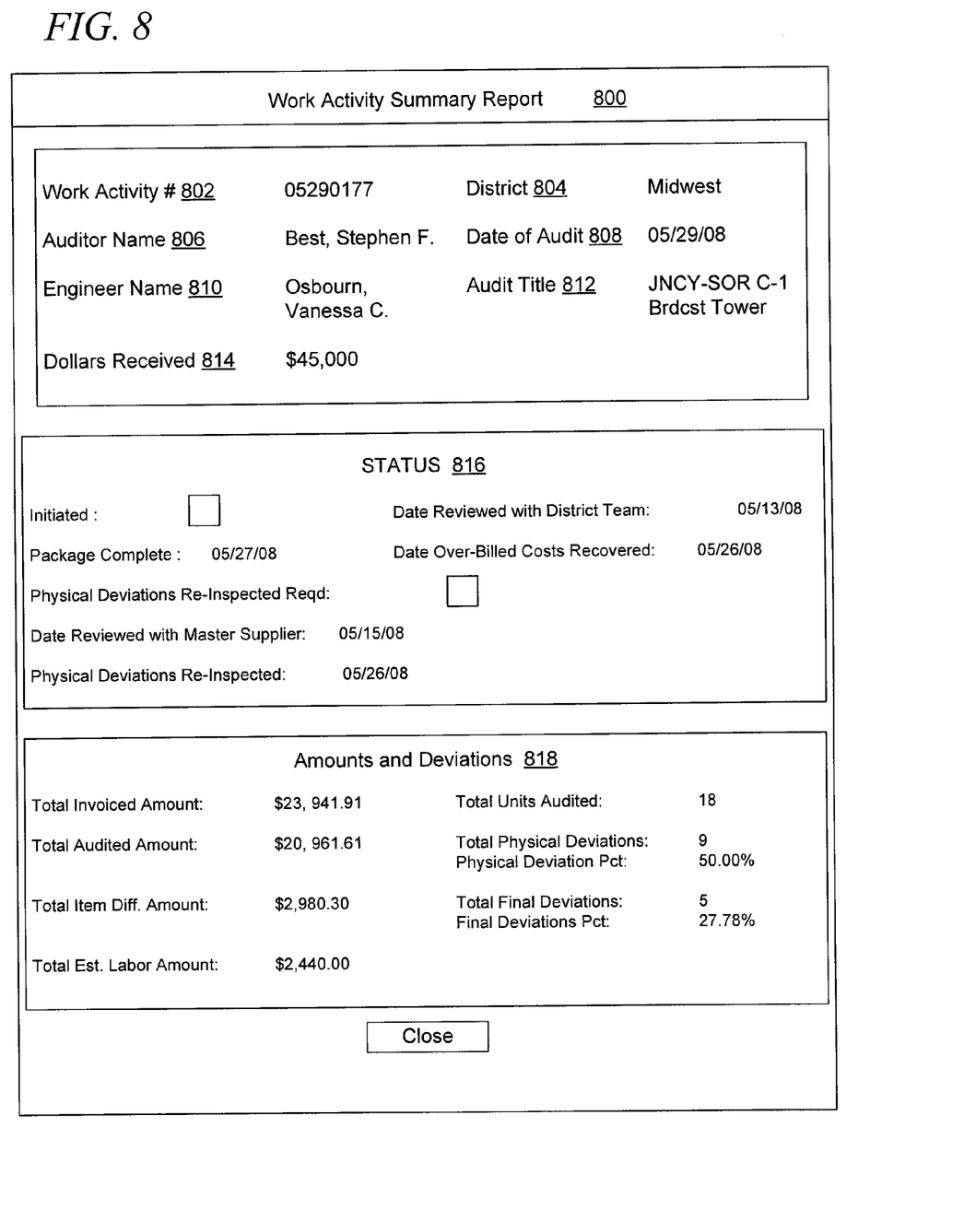
FIG. 8 is a pictorial representation of a summary report in accordance with an illustrative embodiment.

FIG. 6 is a pictorial representation of a work activity report in accordance with an illustrative embodiment. FIGS. 6-8 are shown as illustrative embodiments of different reports or interfaces that are not limited to the information or presentation illustrated. The work activity report 600 may be a report, screen, or user interface for displaying information and receiving user feedback. For example, the work activity report 600 may allow a user to query projects for a particular region within a specified date range. For example, the work activity report may allow a user to view projects, defects, and related issues. The work activity report 600 may include any number of buttons, icons, links, or other selection or interactive elements.

In one embodiment, the work activity report 600 may include an auditor 602, a division 604, a date 606, a region 608, inspections 610, completed audits 612, a category 614, units 616, defects 618, and index 620, quality of work 622, protection of facilities 624, customer service 626, schedule adherence 628, regulations & safety 630, records accuracy 632, and billing accuracy 634.

The auditor 602 may specify one or more auditors that audited a project. The division 604 may be an applicable division of the company or organization that had work performed by the contractor. The date 606 may specify the applicable time period the work activity report 600 covers. The region 608 may specify one or more regions of the communications service provider by city, county, state, neighborhood, country or other designator. The inspections 610 may specify the total audits initiated, completed, re-inspections requested, re-inspections performed, and other inspection information. By selecting the completed audits 612, the user may be shown a list of completed audits statistically and numerically represented by the work activity report 600.

The category 614 may represent the different indicators used to rate and/or rank contractors based on performance. The work activity report 600 may include any number of other categories or designations which may include quality of work 622, protection of facilities 624, customer service 626, schedule adherence 628, regulations & safety 630, records accuracy 632, and billing accuracy 634. The units 616 may represent the number of projects or work functions performed for the region and time period illustrated by the work activity report 600. The defects 618 may indicate problems or issues with the work functions or projects. The index 620 may represent a percentage of the projects that did not experience service affecting or non-service affecting problems.

The quality of work 622, protection of facilities 624, customer service 626, schedule adherence 628, regulations & safety 630, records accuracy 632, and billing accuracy 634 may specify the issues, problems, or deviations for each category 614. Additional information may also include specifying issue codes and may indicate whether the issue was service affecting or non-service affecting. As a result, the severity or problems associated with the issue may be categorized.

FIG. 7 is a pictorial representation of a detailed work activity report in accordance with an illustrative embodiment. The detailed work activity report 700 is a particular implementation of a work activity that may be selected from the work activity report 600 of FIG. 6.

The detailed work activity report 700 may include sections 702, 704, 706, 708, and 710. Section 702 includes information about the audit or project. As shown, section 702 may specify the work activity, auditor name, date of audit, district, total invoice amount, total audited amount, total item difference amount, total estimated labor amount, work assignment title, engineer name, and dollars recovered.

Section 704 may specify further information about the work activity which may include location designation, invoice number, vendor number, contract number, contract firm, employee, date work completed, date invoice approved, and remarks. Section 706 may indicate the specific categories of the work activity, and section 708 may indicate the user entered details for the categories as well as the sub totals, totals, and other amounts. Section 710 may specify summary information regarding the status of the audit for review by management, suppliers, and contractors.

FIG. 8 is a pictorial representation of a summary report in accordance with an illustrative embodiment. The summary report 800 may include a work activity 802, district 804, auditor name 806, date of audit 808, engineer name 810, audit title 812, dollars received 814, status section 816, and amounts and deviations section 818. The work activity 802 may specify the project or projects that have been audited and are available for review. The district 804, auditor name 806, date of audit 808, engineer name 810, and audit title 812 may specify details about the project as previously described. The status section 816 and amounts and deviations section 818 may allow a user to quickly analyze the physical and financial deviations for a project. In addition, the status section 816 and the amounts and deviations section 818 may specify audit information used to generate the contractor score card.

The status section 816 may allow a user to view the status of an ongoing audit. The status section 816 may include information, such as when the audit was initiated, the date it was reviewed, the date the audit package was generated, over-billed costs recovered, physical deviations re-inspection requirements and date, contractor comments, and other similar information.

The amounts and deviations section 818 may provide specific monetary amounts and financial deviations. In one embodiment, the amounts and deviations section 818 may specify the total invoiced amount, audited amount, item difference amount, estimated labor amount, units audited, physical deviations percentage, final deviations, and final deviations percentage.

The illustrative embodiments provide a system and method for monitoring the performance of contractors installing telecommunications equipment. Information is compiled, recorded, and compared in order to determine the effectiveness of each project. In particular, the physical and financial deviations are tracked in order to ensure projects are installed according to specified laws, regulations, zoning requirements, communications standards, and customer preferences.

The previous detailed description is of a small number of embodiments for implementing the invention and is not

What is claimed as new and desired to be protected by Letters Patent of the United States is:

1. A method for auditing installation of communications facilities, the method comprising:
 receiving network engineering information in a server, the network engineering information including telecommunications installation requirements specified by a communications service provider for one or more telecommunications projects and a budget associated with each of the one or more telecommunications projects;
 displaying a portal configured to receive telecommunications installation information directly from one or more contractors assigned to perform the one or more telecommunication projects;
 suggesting, with the portal, at least one of the one or more telecommunications projects for audit based in part on installation histories of the one or more contractors;
 receiving, with the portal, a selection of at least one of the suggested telecommunications projects for audit;
 receiving auditing information associated with the selected telecommunications projects in the server, the auditing information received from one or more auditors and addressing compliance with at least the telecommunication installation requirements;
 automatically comparing the auditing information and the network engineering information to the telecommunications installation information in the server to determine deviations; and
 generating a report for adjusting the compensation of the contractor, wherein the report comprises descriptions of physical and financial deviations between the engineering information and the installation information, a physical deviation code, and a financial deviation code.

2. The method according to claim 1, further comprising:
 adjusting the network engineering information in response to a request from the contractor based on circumstances of the telecommunications installation.

3. The method according to claim 1, further comprising:
 automatically reducing compensation paid to the contractor based on the deviations.

4. The method according to claim 1, further comprising:
 requiring the contractor to redo a portion of the telecommunications project in response to determining a physical deviation within the deviations are not within a threshold.

5. The method according to claim 1, wherein the network engineering information, auditing information, and the telecommunications installation information include entries for a plurality of criteria utilized to determine the deviations.

6. The method according to claim 1, further comprising:
 prompting one or more users to enter a plurality of criteria utilized to determine deviations for the network engineering information, auditing information, and telecommunications installation information utilizing a plurality of menus.

7. The method according to claim 1, further comprising:
 querying a system to retrieve records from the network engineering information, auditing information, and telecommunications installation information.

8. The method according to claim 1, further comprising:
 printing a blank form with a plurality of criteria for auditing the telecommunications project, wherein one of the one or more auditors enters written answers on the blank form; and
 utilizing character recognition to translate the written answers to the audit information.

9. The method according to claim 1, further comprising:
 generating a score card rating the performance of the contractor based on the deviations for the one or more telecommunications projects.

10. The method according to claim 9, wherein the score card includes:
 quality of work, billing accuracy, records accuracy, protection of facilities, customer service, regulations and safety, and schedule adherence.

11. The method according to claim 1, further comprising:
 generating a composite score for the one or more contractors by averaging ratings for a plurality of telecommunications projects over a time period.

12. A server configured to audit telecommunications information, the server comprising:
 a user interface configured to
  receive network engineering information, and telecommunications installation information for one or more telecommunications projects from users by presenting menus and querying the users;
  display at least one of the one or more telecommunications projects suggested by the server for audit, wherein the server suggests at least one of the one or more telecommunications projects for audit based in part on installation histories of contractors;
  receive a selection of at least one of the suggested telecommunications projects for audit;
  receive the audit information received from one or more auditors and addresses at least compliance of the selected telecommunications projects with telecommunications installation requirements included within the network engineering information;
 one or more databases in communication with the user interface configured to store the network engineering information, audit information and telecommunications installation information; and
 a comparator in communication with the one or more databases configured to compare the network engineering information and audit information with the telecommunications installation information to determine deviations for telecommunications criteria included in the network engineering information, audit information, and telecommunications installation information, wherein the user interface outputs a score card based on the deviations ranking the performance of one or more contractors, wherein the user interface displays a report comprising descriptions of physical and financial deviations between the engineering information and the installation information, a physical deviation code, and a financial deviation code.

13. The server according to claim 12, wherein the user interface is available to the users by utilizing a network connection through a web portal.

14. The server according to claim 12, wherein the user interface is configured to store and retrieve information from the one or more databases.

15. The server according to claim 12, wherein the user interface, the one or more databases, and the comparator are an audit program executed by the server to determine whether installation of telecommunications communications facilities are being performed within performance thresholds.

16. The server according to claim 12, further comprising:
an invoice system in communication with the comparator configured to reduce compensation paid to one or more contractors based on the deviations.

17. The server according to claim 12, further comprising:
a communication system configured to communicate the score card and a ranking for a plurality of telecommunications projects to the one or more contractors.

18. A server for rating the performance of contractors of installing communications facilities, the server comprising:
a processor for executing a set of instructions;
a memory for storing the set of instructions, wherein the set of instructions are configured to:
receive engineering information for a plurality of criteria including at least installation requirements specified by a communications service provider and a budget for each of one or more projects;
display a portal configured to receive installation information for the plurality of criteria from one or more contractors assigned to perform the one or more projects;
suggest, with the portal, at least one of the one or more projects for audit based in part on installation histories of the one or more contractors;
receive, with the portal, a selection of at least one of the suggested projects for audit;
receive auditing information for the selected projects, the auditing information received from the one or more auditors; automatically compare the auditing information and the engineering information to the installation information to determine deviations for the plurality of criteria; and
generate a report for adjusting the compensation of the contractor, wherein the report comprises descriptions of physical and financial deviations between the engineering information and the installation information, a physical deviation code, and a financial deviation code.

19. The server of claim 18, wherein the set of instructions are further configured to:
reduce compensation paid to the contractor based on the deviations; and
require the contractor to redo a portion of the project in response to determining a physical deviation within the deviations are not within a threshold.

20. The server of claim 18, further comprising:
generating a score card indicating a performance rating for the contractor based on the deviations for the one or more projects.

* * * * *